US009894649B2

(12) United States Patent
Jeong et al.

(10) Patent No.: US 9,894,649 B2
(45) Date of Patent: Feb. 13, 2018

(54) METHOD AND DEVICE FOR CARRIER ACTIVATION IN CARRIER AGGREGATION SYSTEM

(75) Inventors: Kyeong In Jeong, Suwon-si (KR); Gert Jan Van Lieshout, Middlesex (GB); Boon Loong Ng, Richardson, TX (US); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 14/009,963

(22) PCT Filed: Apr. 5, 2012

(86) PCT No.: PCT/KR2012/002592
§ 371 (c)(1),
(2), (4) Date: Oct. 4, 2013

(87) PCT Pub. No.: WO2012/138157
PCT Pub. Date: Oct. 11, 2012

(65) Prior Publication Data
US 2014/0023055 A1    Jan. 23, 2014

Related U.S. Application Data

(60) Provisional application No. 61/471,872, filed on Apr. 5, 2011, provisional application No. 61/484,645, filed on May 10, 2011.

(30) Foreign Application Priority Data

Apr. 5, 2012 (KR) .................. 10-2012-0035573

(51) Int. Cl.
*H04L 5/00* (2006.01)
*H04W 72/04* (2009.01)
*H04W 56/00* (2009.01)

(52) U.S. Cl.
CPC ......... *H04W 72/0446* (2013.01); *H04L 5/001* (2013.01); *H04L 5/0098* (2013.01); *H04W 72/042* (2013.01); *H04W 56/0045* (2013.01)

(58) Field of Classification Search
CPC ............. H04W 56/0005; H04W 56/00; H04W 56/0045; H04W 36/08; H04W 56/009; H04W 72/1263; H04W 92/10
(Continued)

(56) References Cited

U.S. PATENT DOCUMENTS 6,829,227 B1    12/2004  Pitt et al.
7,184,792 B2 *   2/2007  Mir ..................... H04W 56/00
                                                    370/328
(Continued)

FOREIGN PATENT DOCUMENTS

CN    101547477 A    9/2009
CN    101790200 A    7/2010
(Continued)

OTHER PUBLICATIONS

3GPP TSG-RAN WG2 Meeting #70bis, Uplink Activation & Deactivation of SCells, R2-103536, Nokia, Jun. 28, 2010-Jul. 2, 2010.
(Continued)

*Primary Examiner* — Sai Aung
(74) *Attorney, Agent, or Firm* — Jefferson IP Law, LLP

(57) ABSTRACT

The present invention relates to a method and a device for cell activation in a carrier aggregation system, and the method for activating a cell of a terminal according to one embodiment of the present invention comprises: a step for receiving an activation message of a first cell; a step for activating the first cell when the message of the first cell is received; an information obtaining step for obtaining uplink activation information of the first cell; and a transmission determination step for determining whether to execute an
(Continued)

uplink transmission according to the uplink activation information. According to an embodiment of the present invention, efficient carrier management plan can be provided.

14 Claims, 13 Drawing Sheets

(58) Field of Classification Search
USPC .............................. 370/350, 324, 331, 503
See application file for complete search history.

(56) References Cited

U.S. PATENT DOCUMENTS

| | | | |
|---|---|---|---|
| 7,403,789 B2* | 7/2008 | Takano | H04B 7/2681 370/324 |
| 8,260,297 B2* | 9/2012 | Jeong | H04B 7/2681 370/324 |
| 8,711,785 B2 | 4/2014 | Gholmieh et al. | |
| 8,989,025 B2* | 3/2015 | Kazmi | H04W 56/0005 370/252 |
| 2007/0147337 A1* | 6/2007 | Bosch | H04B 7/2681 370/350 |
| 2008/0165756 A1 | 7/2008 | Ma | |
| 2009/0232118 A1* | 9/2009 | Wang | H04L 5/0091 370/338 |
| 2009/0238098 A1 | 9/2009 | Cai et al. | |
| 2009/0245191 A1 | 10/2009 | Ball et al. | |
| 2009/0257353 A1 | 10/2009 | Song et al. | |
| 2010/0034176 A1 | 2/2010 | Heo et al. | |
| 2010/0054237 A1* | 3/2010 | Han | H04J 3/0638 370/350 |
| 2010/0080181 A1* | 4/2010 | Yamada | H04W 56/0005 370/329 |
| 2010/0103873 A1 | 4/2010 | Buracchini | |
| 2010/0110897 A1 | 5/2010 | Chun et al. | |
| 2010/0144299 A1 | 6/2010 | Ren | |
| 2010/0159919 A1 | 6/2010 | Wu | |
| 2011/0158116 A1 | 6/2011 | Tenny et al. | |
| 2011/0235609 A1* | 9/2011 | Ahn | H04L 5/0007 370/329 |
| 2011/0243048 A1* | 10/2011 | Wang | H04L 5/0051 370/311 |
| 2011/0243106 A1* | 10/2011 | Hsu | H04L 5/0096 370/336 |
| 2011/0249635 A1* | 10/2011 | Chen | H04W 74/002 370/329 |
| 2011/0292874 A1 | 12/2011 | Ho et al. | |
| 2011/0317777 A1* | 12/2011 | Huang | H04W 74/004 375/259 |
| 2012/0069788 A1 | 3/2012 | Shen et al. | |
| 2012/0172079 A1 | 7/2012 | Baldemair et al. | |
| 2013/0121203 A1 | 5/2013 | Jung et al. | |
| 2014/0314015 A1 | 10/2014 | Xu et al. | |
| 2016/0081045 A1 | 3/2016 | Bostrom et al. | |

FOREIGN PATENT DOCUMENTS

| | | |
|---|---|---|
| CN | 103119996 A | 5/2013 |
| CN | 103141041 A | 6/2013 |
| EP | 2 214 448 A1 | 8/2010 |
| EP | 2 429 252 A1 | 3/2012 |
| JP | 2011-508559 A | 3/2011 |
| JP | 2012531121 A | 12/2012 |
| JP | 2013-533673 A | 8/2013 |
| JP | 2014506059 A | 3/2014 |
| WO | 2009/096745 A1 | 8/2009 |
| WO | 2010/065759 A2 | 6/2010 |
| WO | 2010/127520 A1 | 11/2010 |
| WO | 2010/148404 A1 | 12/2010 |
| WO | 2011/002789 A1 | 1/2011 |
| WO | 2011/020407 A1 | 2/2011 |
| WO | 2011/050564 A1 | 5/2011 |

OTHER PUBLICATIONS

3GPP TSG-RAN WG2 Meeting #70bis, UL activation and details of MAC CE for CC Management, R2-103605, Panasonic, Jun. 28, 2010-Jul. 2, 2010.

3GPP TSG-RAN2#69, CA support for multi-TA, R2-101567, E-mail rapporteur (NTT Docomo, Inc.), Feb. 18, 2010, Sections 1-4, San Francisco, USA.

Ericsson et al., Adding a Power Management Indication in PHR, 3GPP TSG-RAN2 Meeting #73, Taipei, Taiwan, Feb. 21-25, 2011, R2-110940.

3rd Generation Partnership Project; Technical Specification Group Radio Access Network; Evolved Universal Terrestrial Radio Access (E-UTRA); Medium Access Control (MAC) Protocol Specification (Release 10), 3GPP TS 36.321, Dec. 2010, pp. 1-53, V10.0.0, 3GPP, Valbonne, France.

3rd Generation Partnership Project; Technical Specification Group Radio Access Network; Evolved Universal Terrestrial Radio Access (E-UTRA); Medium Access Control (MAC) Protocol Specification (Release 10), 3GPP TS 36.321, Mar. 2011, pp. 1-53, V10.1.0, 3GPP, Valbonne, France.

3rd Generation Partnership Project; Technical Specification Group Radio Access Network; Evolved Universal Terrestrial Radio Access (E-UTRA); Radio Resource Control (RRC); Protocol Specification (Release 10), 3GPP TS 36.331, Dec. 2010, pp. 119, 159-161, and 172, 3GPP, Valbonne, France.

Ericsson, St-Ericsson, Qualcomm Inc, Nokia Siemens Networks, "Power Management indication in PHR", 3GPP, Feb. 21-25, 2011, TSG-RAN WG2#73 R2-110941.

Interdigital, "PHR Triggering for SAR", 3GPP, Jan. 17-21, 2011, TSG-RAN WG2#72bis R2-110220, Dublin, Ireland.

Qualcomm Inc, "PHR Trigger for Power Reduction Due to Power Management", 3GPP, Feb. 21-25, 2011, R2-110797, Taipei, Taiwan.

Ericsson et al: "Timing Advance Maintenance for SCells"; Mar. 20, 2012; 3GPP Draft; R2-121558; XP050606352.

3rd Generation Partnership Project; "Technical Specification Group Radio Access (E-UTRA); Radio Resource Control (RRC); Protocol specification (Release 10)"; Mar. 30, 2011; pp. 1-290; No. V10.1.0; 3GPP Standard; 3GPP TS 36.331, XP050476531.

Huawei et al.; "Remaining issues regarding PLF reporting for MDT"; 3GPP Draft; R2-111239 Feb. 15, 2011; vol. RAN WG2; XP050493739.

"3rd Generation Partnership Project; Technical Specification Group Radio Access Network; Evolved Universal Terrestrial Radio Access (E-UTRA); User Equipment (UE) radio access capabilities (Release 10)", 3GPP Standard; 3GPP TS 36.306, 3rd Generation Partnership Project (3GPP), Mobile Competence Centre; 650, Route Des Lucioles;F-06921 Sophia Antipoliscedex; France, No. V10.0.0, Dec. 17, 2010 (Dec. 17, 2010), pp. 1-17,XP050462122, [retrieved on Dec. 17, 2010].

CCL/ITRI: "Random Access Transmission 1-10 with Priority in E-UTRA Uplink", 3GPP Draft; R1-060140, 3rd Generation Partnership Project (3GPP), Mobile Competence Centre; 650, Route Des Lucioles; F-06921 Sophia-Antipolis Cedex; France vol. RAN WGI, No. Helsinki, Finland; Jan. 23, 2006, Jan. 21, 2006 (Jan. 21, 2006), XP050417569.

3GPP, "3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.1.0, Mar. 3, 2011 <http:www.3gpp.org/ftp/Specs/archive/36_series/36.331/>.

Huawei et al. "Extension to Radio Link Failure reporting for MDT and MRO", 3GPP TSG-RAN WG2 Meeting #72bis, R2-110101, Jan. 10, 2011 <http://www.3gpp. org/ftp/tsg_ran/WG2_RL2/TSGR2_72bis/Docs/>.

Qualcomm Incorporated, PHR Trigger for Power Reduction Due to Power Management[online], 3GPP TSG-RAN2 #73 R2-110797 [retrieved on Oct. 30, 2017], Retrieved from the Internet: <URL: http://www.3gpp.org/ftp/tsg_ran/WG2_RL2/TSGR2_73/Docs/R2-110797.zip>, Feb. 14, 2011, pp. 1-4.

(56) References Cited

OTHER PUBLICATIONS

Ericsson, ST-Ericsson, Qualcomm Incorporated, Nokia Siemens Networks, Adding a Power Management indication in PHR[online], 3GPP TSG-RAN2 #73 R2-111601, [retrieved on Oct. 30, 2017]Retreived from the Internet: <URL: http://www.3gpp.org/ftp/tsg_ran/WG2_RL2/ TSGR2_73/Docs/R2-111601.zip>, Feb. 24, 2011, pp. 1-4.
3GPP TS 36.321 V10.0.0, Dec. 2010, URL, http://www.3gpp.org/ftp/Specs/archive/36_series/36.321/36321-a00.zip.
MediaTek Inc., Rel-10 PHR for non-CA UE, 3GPP TSG-RAN WG2 Meeting #72bis; R2-110244, Jan. 11, 2011 U R L, http:www.3gpp.org/ftp/tsg_ran/WG2_RL2/TSGR2_72bis/Docs/R2-110244.zip.
3GPP TS 36.331 V10.0.0, Dec. 21, 2010, pp. 56, 59, 63, 159-161, 238, URL, http://www.3gpp.org/ftp/Spe cs/archive/36_series/36.331/36331-a00.zip.
Qualcomm Incorporated, "Power Managment Based PHR Trigger", 3GPP TSG-RAN2 Meeting #72bis, R2-110177, Jan. 11, 2011 <http://www.3gpp.org/ftp/tsg_ran/WG2_RL2/ TSGR2_72bis/Docs/>.
Qualcomm Incorporated, "Definiation of Pcmax,c", 3GPP TSG RAN4 #57AH, R4-110567, Jan. 26 2011 <http://www.3gpp.org/ftp/tsg_ran/ WG4_Radio/TSGR4_57AH/Docs/>.
Introduction of new PHR trigger to indicate the configured maximum UE power variation., 3GPP TSG-RAN2 Meeting #72, R2-106896 (Nov. 19, 2010) http://www.3gpp.org/ftp/tsg_ran/wg2_rl2/TSGR2_72/Docs/.

* cited by examiner

METHOD AND DEVICE FOR CARRIER ACTIVATION IN CARRIER AGGREGATION SYSTEM

TECHNICAL FIELD

The present invention relates to a carrier activation method and apparatus for use in a carrier aggregation system.

BACKGROUND ART

The mobile communication system has been developed for the user to communicate on the move. With the rapid advance of technologies, the mobile communication system has evolved to the level capable of providing high speed data communication service as well as voice telephony service. Recently, as one of the next generation mobile communication system, Long Term Evolution (LTE) is on the standardization by the 3$^{rd}$ Generation Partnership Project (3GPP). LTE is a technology designed to provide high speed packet-based communication of up to 100 Mbps and aims at commercial deployment around 2010 timeframe.

Meanwhile, unlike voice service, the data service is provided on the resource determined according to the data amount to be transmitted and channel condition. Accordingly, the wireless communication system, especially cellular communication, is provided with a scheduler manages transmission resource allocation in consideration of the required resource amount, channel condition, data amount, etc. This is the fact in the LTE system as the next generation mobile communication system, and the scheduler located at the base station manages the transmission resource allocation.

Recent studies are focused on the LTE-Advanced (LTE-A) for improving data rate with the adaptation of several new techniques to legacy LTE system. Carrier Aggregation (CA) is one of such technologies. CA is the technology that aggregates a plurality of carriers for uplink and downlink transmission between a User Equipment (UE) and an evolved Node B (eNB) so as to increases the data reception amount/reception data rate or transmission amount/transmission data rate in proportion to the number of aggregated carriers. In LTE, the cell operating on the main carrier frequency is referred to as Primary Cell (PCell) and the other cells operating on other frequency carriers are referred to as Secondary Cell (SCell).

Meanwhile, with the introduction of repeater and Remote Radio Head (RRH), the positions of antennas responsible for the radio transmission/reception change (e.g. the transmit/receive antennas for the secondary carrier may be located at the RRHs while the transmit/receive antennas for the primary carrier are located at the eNB) and, in this case, it is prefer to acquire the uplink transmission timing to a receive antenna near the terminal location rather than the uplink transmission timing to a receive antenna far from the terminal location. This means that a plurality of uplink transmission timings may exist and thus there is a need of a method for managing carriers efficiently in a carrier aggregation scenario including a plurality of uplink transmission timings.

DISCLOSURE OF INVENTION

Technical Problem

The present disclosure is proposed to solve the above problem and aims to provide an efficient carrier management method.

Solution to Problem

In accordance with an aspect of the present disclosure, a cell activation method of a terminal includes receiving a first cell activation message, activating, when the first cell activation message is received, the first cell, acquiring uplink activation information on the first cell, and determining whether to perform uplink transmission depending on the uplink activation information.

In accordance with another aspect of the present disclosure, a terminal includes a transceiver which receives an activation message for a first cell, a scheduler which activates, when the activation message for the first cell is received, the first cell, acquires uplink activation information on the first cell, and determines whether to perform uplink transmission according to the uplink activation information.

In accordance with another aspect of the present disclosure, a cell activation method of a base station includes transmitting an activation message for a first cell to a terminal, determining whether uplink transmission timing synchronization for the first cell is required, and transmitting, when uplink transmission timing synchronization for the first cell is required, an indicator indicating suspension of uplink transmission in the first cell to the terminal.

In accordance with still another aspect of the present disclosure, a base station includes a transceiver which transmits an activation message for a first cell to a terminal and a scheduler which determines whether uplink transmission timing synchronization for the first cell is required and controls, when uplink transmission timing synchronization for the first cell is required, the transceiver to transmit an indicator indicating suspension of uplink transmission in the first cell to the terminal.

Advantageous Effects of Invention

The present disclosure is capable of providing an efficient carrier management method.

MODE FOR THE INVENTION

Figure 1:
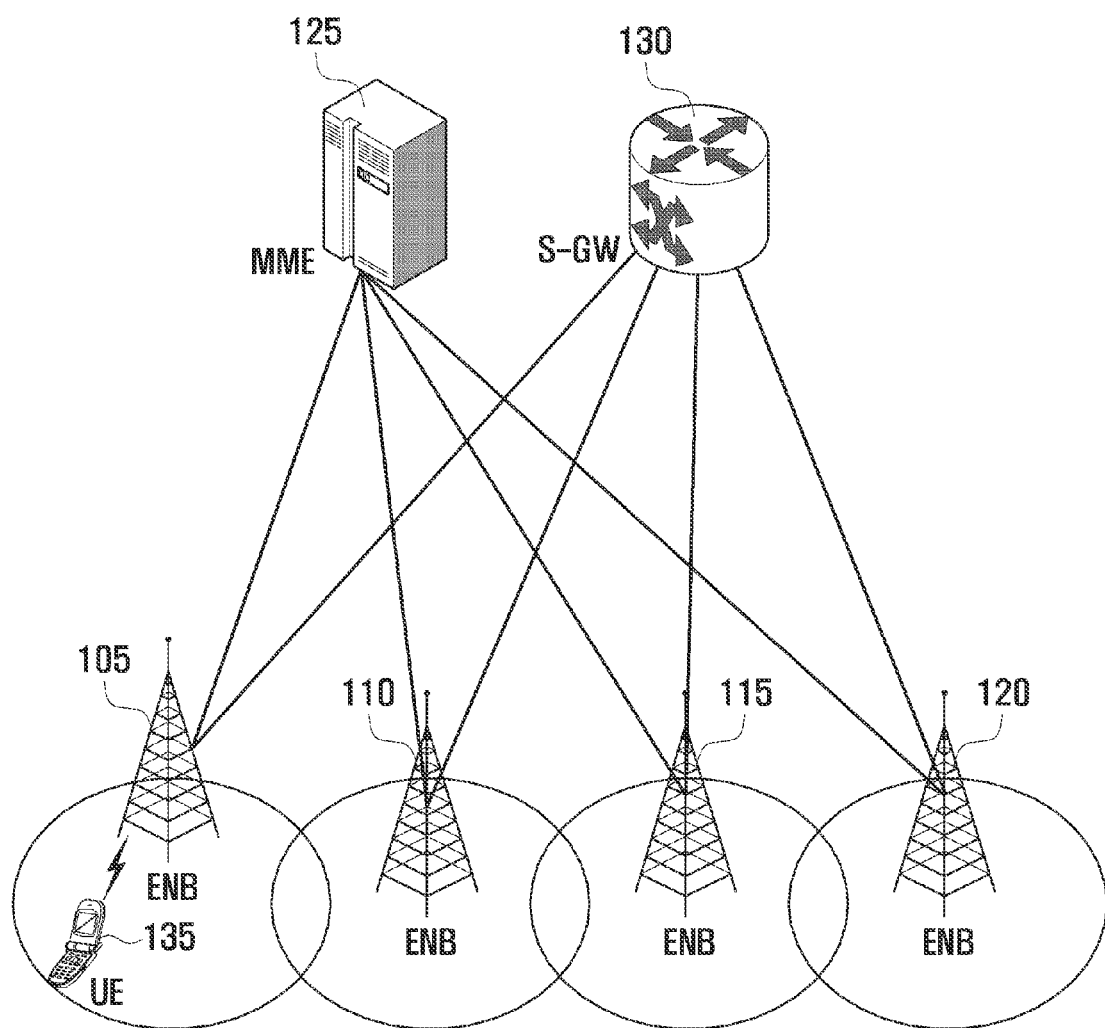
FIG. 1 is a diagram illustrating network architecture of a 3GPP LTE system according to an embodiment of the present disclosure.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

Hereinafter, exemplary embodiments of the present invention are described with reference to the accompanying drawings in detail.

The present disclosure proposes a method for activating a serving cell (e.g. SCell) operating on a secondary carrier configured for use in the carrier aggregations with a plurality of uplink timings. According to the legacy carrier aggregation operation, the mobile communication system configures serving cells on the secondary carriers and activates the serving cell to transmit and receive data through the serving cells. According to an embodiment of the present disclosure, the terminal operates differently depending when it maintains valid uplink transmission timing synchronization for the activated serving cells.

If the terminal has acquired or is maintaining the uplink transmission timing synchronization with the serving cell commanded/indicated to be activated (i.e. uplink transmission timing synchronization for the serving cell or uplink transmission timing synchronization for other serving cell to which the same uplink transmission timing as the serving cell is applied is maintained), the uplink transmission of Physical Uplink Shared Channel (PUSCH) scheduled for the serving cell or Sounding Reference Symbol (SRS) configured for the corresponding serving cell is performed at the corresponding timing immediately.

Otherwise if the terminal has no uplink transmission timing synchronization with the serving cell command/indicated to be activated, the scheduled PUSCH uplink transmission is ignored the SRS uplink transmission is suspended until receiving uplink transmission timing information through random access procedure in the corresponding serving cell. In this case, the PUSCH uplink transmission and suspended SRS uplink transmission are started after acquiring uplink transmission timing synchronization based on the uplink transmission timing information acquired through the random access procedure in the corresponding serving cell.

There are two methods for the terminal to determine whether the uplink transmission timing with the serving cell commanded/indicated to be activated is maintained. In the first method, the terminal determines in itself whether it maintains uplink transmission timing synchronization with the serving cell or other serving cell using the same uplink transmission timing as the corresponding serving cell. In the second method, the base station notifies the terminal explicitly through signaling whether PUSCH and SRS uplink transmission is possible immediately after activation or after acquiring uplink transmission timing synchronization upon receipt of the uplink transmission timing information through random access procedure in commanding/indicating activation of the serving cell.

FIG. 1 is a diagram illustrating network architecture of a 3GPP LTE system according to an embodiment of the present disclosure. According to an embodiment of the present disclosure, the LTE network includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130. The User Equipment (UE) 135 connects to an external network through the eNB 105 and SGW 130. The eNBs 105, 110, 115, and 120 correspond to the legacy node B of UMTS system. The eNB 105 establishes a radio channel with the UE 135 and is responsible for complex functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
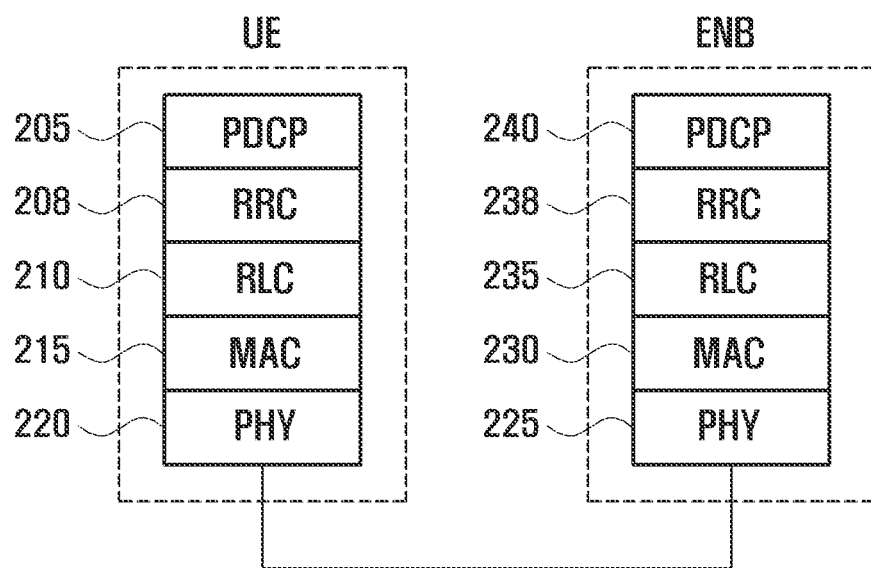
FIG. 2 is a diagram illustrating a protocol stack of the LTE system to which the present invention is applied.

FIG. 2 is a diagram illustrating a protocol stack of the LTE system to which the present invention is applied. Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP is responsible for IP header compression/decompression, ciphering, and Integrity Protection. The RRC 208 and 238 defines the higher layer control information message transmission and related operation/procedure for handling radio resource. The RLC 210 and 235 is responsible for segmenting the PDCP Protocol Data Unit (PDU) into appropriate size. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

Figure 3:
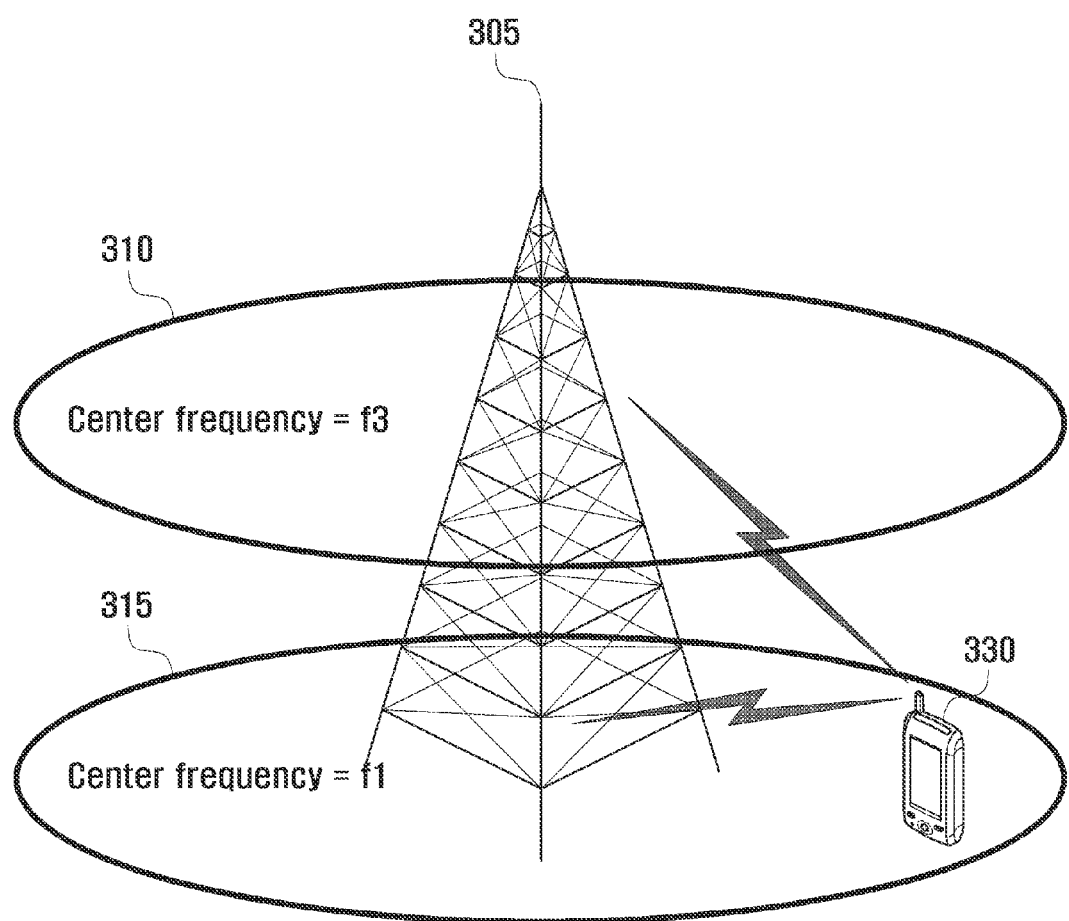
FIG. 3 is a diagram illustrating an exemplary situation of carrier aggregation in the LTE system to which the present invention is applied.

FIG. 3 is a diagram illustrating an exemplary situation of carrier aggregation in the LTE system to which the present invention is applied. Referring to FIG. 3, typically an eNB can use multiple carriers transmitted and receive in different frequency bands. For example, the eNB 305 can be configured to use the carrier 315 with center frequency f1 and the carrier 310 with center frequency f3. If carrier aggregation is not supported, the UE 330 has to transmit/receive data unit one of the carriers 310 and 315. However, the UE 330 having the carrier aggregation capability can transmit/receive data using both the carriers 310 and 315. The eNB may increase the amount of the resource to be allocated to the UE having the carrier aggregation capability in adaptation to the channel condition of the UE so as to improve the data rate of the UE.

Although the above description has been directed to the transmitter side of the eNB, it is applicable to the receiver side of the eNB in the same manner. Unlike the legacy UE transmitting data using one of the plurality carriers, the carrier aggregation-enabled terminal is capable of transmitting data using plural carriers simultaneously so as to increase the data rate. In case that a cell is configured with one downlink carrier and one uplink carrier as a conventional concept, the carrier aggregation can be understood as if the UE communicates data via multiple cells. With the use of carrier aggregation, the peak data rate increases in proportion to the number of aggregated carriers. In the following description, the phrase "the UE receives data through a certain downlink carrier or transmits data through a certain uplink carrier" means to transmit or receive data through control and data channels provided in a cell corresponding to center frequencies and frequency bands of the downlink and uplink carriers. Although the description is directed to an LTE mobile communication system for explanation convenience, the present invention can be applied to other types of wireless communication systems supporting carrier aggregation.

Figure 4A:
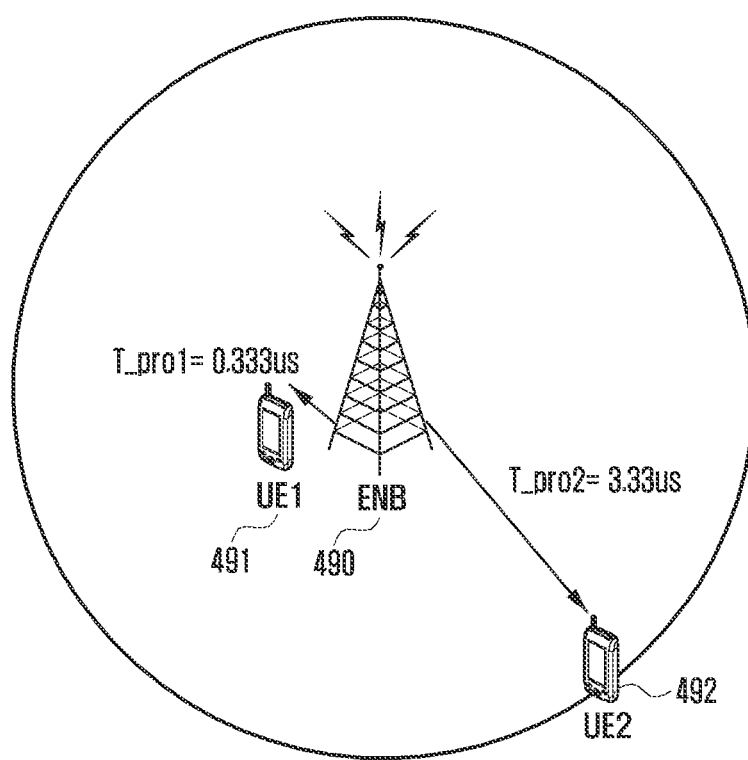
FIG. 4 is a diagram illustrating a principle of uplink timing synchronization in the OFDM-based 3GPP LTE system to which the present invention is applied.
Figure 4B:
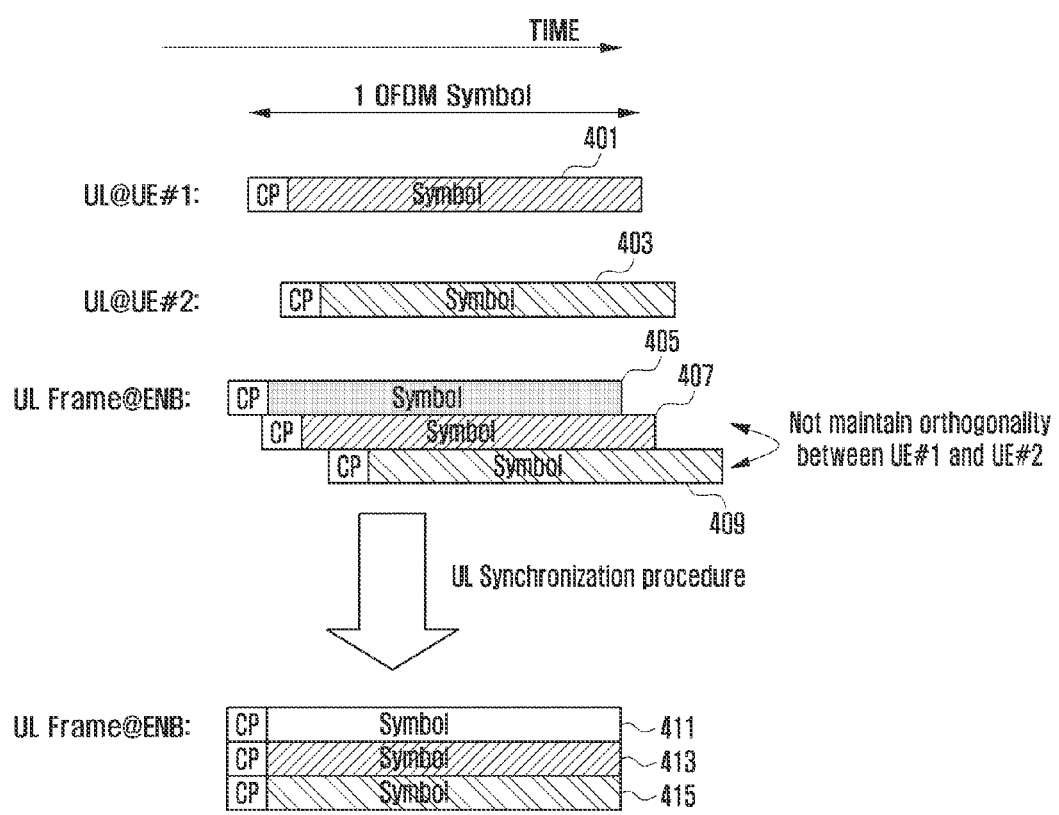

FIGS. 4a and 4b are diagrams illustrating a principle of uplink timing synchronization in the OFDM-based 3GPP LTE system to which the present invention is applied. The UE1 is located near the eNB and the UE2 is located far from the eNB. T_pro1 indicates the first propagation delay time to the UE1, and T_pro2 indicates the second propagation delay to the UE2. The UE1 locates near the eNB as compared to the UE2 and thus has a relatively short propagation delay. In FIG. 4a, T_pro1 is 0.333 us, and T_pro2 is 3.33 us.

Referring to FIG. 4b, the initial uplink timing of the UE 1 491 and UE 2 492 within a cell of the eNB 490 mismatches the uplink timings of the UEs with the cell found by the eNB 490. Reference number 401 denotes uplink OFDM symbol transmission timing of the UE1 491, and reference number 403 denotes uplink OFDM symbol transmission timing of the UE2 492. By taking notice of the uplink transmission propagation delays of the UE 1 491 and UE2 492, the eNB 490 may receive the uplink OFDM symbols at the timings as denoted by reference numbers 407 (for UE1) and 409 (for UE 2). The UE1's uplink symbol is received by the eNB 490 at the timing 407 with a short propagation delay while the UE2's uplink symbol transmitted is received by the eNB 490 at the timing 409 with relatively long propagation delay. The eNB 490 has a reference reception timing 405.

Since the timings 407 and 409 precede the synchronization between the uplink transmission timings of the UE1 and UE2, the uplink OFDM symbol reception and decoding start timing 405 of the eNB, the UE1's uplink OFDM symbol reception timing 407, and the UE2's uplink OFDM symbol reception timing 409 are different among each other. In this case, the uplink symbols transmitted by the UE1 and UE2 are not orthogonal so as to interfere to each other and, as a consequence, the eNB is likely to fail decoding the uplink symbols transmitted, at the timing 401 and 403, by the UE1 and UE2 due to the interference and the mismatch between the uplink symbol reception timings 407 and 409.

Uplink timing synchronization is a procedure for acquiring the eNB's uplink symbol reception timings with the UE1 491 and UE2 492 and, if the uplink timing synchronization procedure completes, it is possible to acquire the synchronization among the eNB's uplink OFDM symbol reception and decoding start timing, UE1's uplink OFDM symbol reception timing, and UE2's uplink OFDM symbol reception timing as denoted by reference numbers 411, 413, and 415. In the uplink timing synchronization procedure, the eNB 490 transmits Timing Advance (hereinafter, referred to as TA) information to the UEs to notify of the timing adjustment amount. The eNB can transmit the TA information in the Timing Advance Commence MAC Control Element (TAC MAC CE) or in the Random Access Response (RAR) message in response to the random access preamble transmitted by the UE for initial access.

Figure 5:
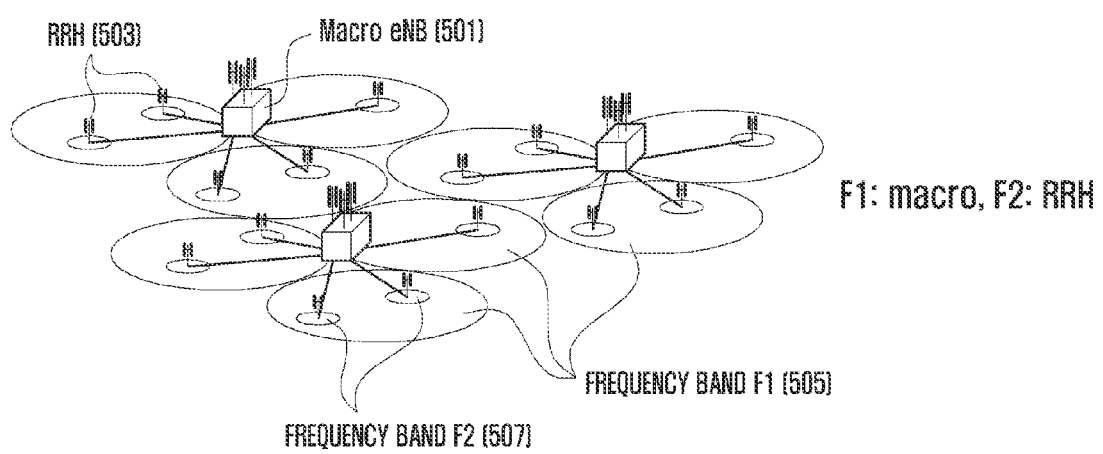
FIG. 5 is a diagram illustrating an exemplary scenario requiring a plurality of uplink timings in carrier aggregation.

FIG. 5 is a diagram illustrating an exemplary scenario requiring a plurality of uplink timings in carrier aggregation. The Remote Radio Heads (RRHs) 503 operating on frequency band F2 507 are deployed around the macro eNB 501 using frequency band F1 505. If the UE uses both the macro eNB 501 and RRH 503 (i.e. if the UE near the RRH 503 aggregates F1 frequency band and F2 frequency band for uplink transmission), the downlink/uplink transmission between the UE and the RRH 503 has short propagation delay and the downlink/uplink transmission between the UE and the macro eNB 501 has relatively long propagation delay. This means that the uplink transmission timing to the RRH 503 differs from the uplink transmission timing to the macro eNB 501. There is a need of a plurality of uplink transmission timings in the above carrier aggregation scenario and, in order to acquire initial uplink transmission timing, it is necessary to configure an uplink transmission timing through random access procedure on F2 for the RRH 503 and another uplink transmission timing through random access procedure on F1 for the macro eNB 501. This means that if multiple uplink transmission timings exist in the carrier aggregation it is necessary to perform the random access procedure in multiple cells for synchronizing the uplink transmission timing. It is not necessary to perform the random access procedures at the same timings in the plural cells.

In the present disclosure, the carriers having the same uplink timings are sorted into a Timing Advance Group (TAG). For example, if one PCell and three SCells A, B, and C are aggregated, the PCell and SCell A have the same uplink timing, and the SCell B and SCell C have the same uplink timing, the PCell and SCell A may be grouped into TAG#0 and the SCell B and SCell C into TAB#1. The TAG#0 including the PCell is referred to as Primary TAG (PTAG) and the TAG#1 including no PCell is referred to as STAG. PCell is the serving cell operating on the primary carrier to which RRC Connection Establishment has been performed initially or the Handover (HO) target cell.

Figure 6:
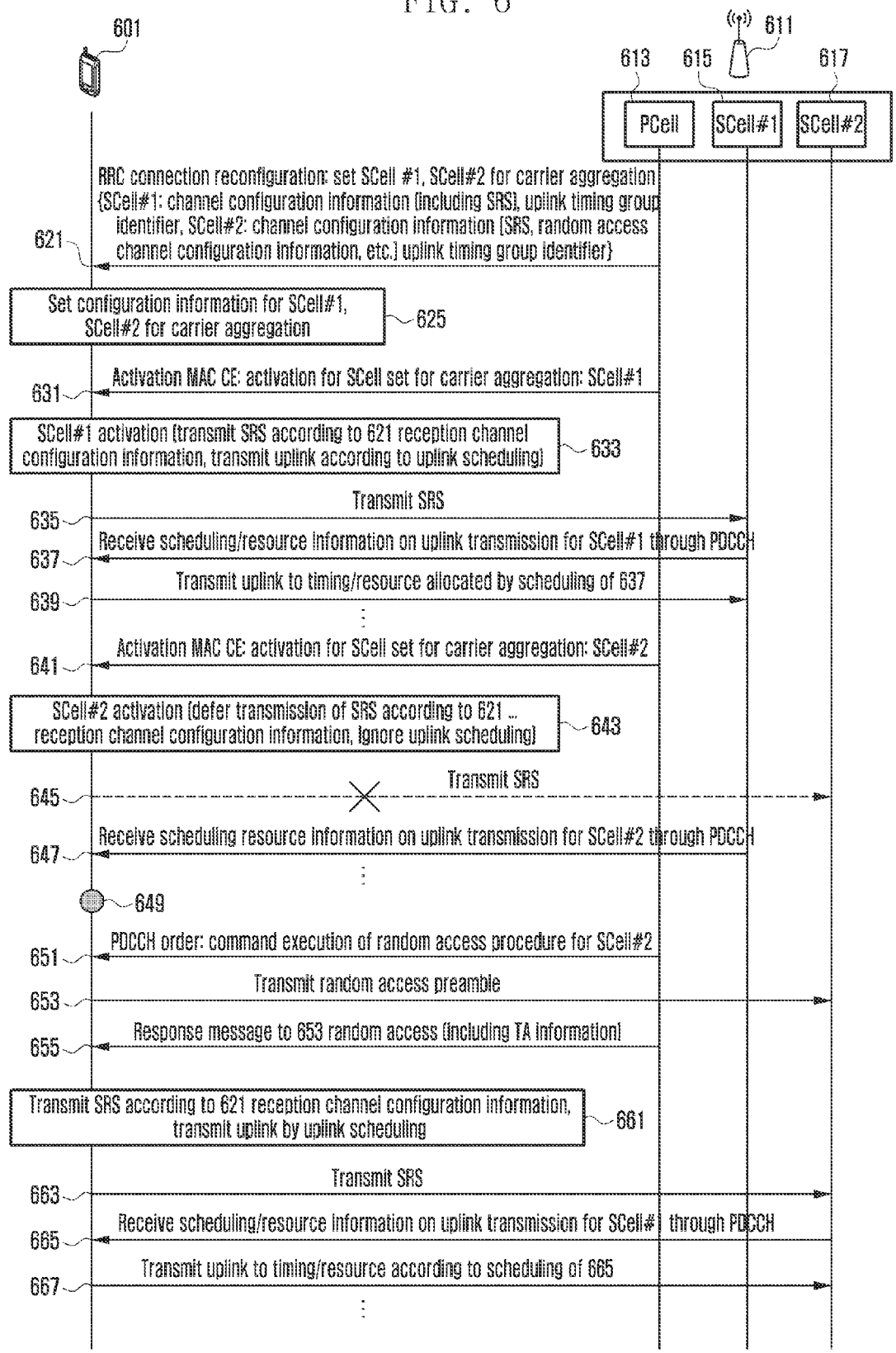
FIG. 6 is a signal flow diagram illustrating a cell activation procedure according to an embodiment of the present disclosure.

FIG. 6 is a signal flow diagram illustrating a cell activation procedure according to an embodiment of the present disclosure. The base station 611 determines to configure the serving cells (SCell#1 615 and SCell#2 617) on the secondary carriers to be aggregated to the UE 601 capable of carrier aggregation in the serving cell of the primary carrier (PCell) 613 and configures the SCell#1 615 and SCell#2 617 as the carrier aggregation component cells of the UE 601 by transmitting configuration information on the SCell#1 625 and SCell#2 617 through a RRC layer message at operation 621. The RRC layer message may be RRCConnectionReconfiguration message defined in the 3GPP TS36.331 RRC. The configuration information on the SCell#1 615 and SCell#2 617 may include the channel configuration information on the serving cells 615 and 617 and the uplink Timing Advance Group (TAG) identifier. The channel configuration information on the serving cells 615 and 617 may include the configuration information on the Sounding Reference Symbol (SRS) channel and the configuration information on the random access channel. The SRS channel is a physical (PHY) channel carrying the signal for use in uplink channel estimation of the eNB.

In the embodiment of FIG. 6, it is assumed that the TAG identifier of the SCell#1 615 is identical with the TAG identifier of the PCell 613 on the current primary carrier and the TAG identifier of the SCell#2 617 differs from the TAG identifier of the PCell 613 and SCell#1 615. That is, the uplink transmission timings of the PCell 613 and the SCell #1 615 are identical with each other while the uplink transmission timing of the SCell#2 617 differs from the uplink transmission timing of the PCell 613 and SCell#1 615. The random access channel configuration information may include the information on both the SCell#1 615 and SCell#2 617 or the information on only the SCell#2 617 having the new uplink transmission timing. In the embodiment of FIG. 6, it is assumed that the information on only the SCell#2 617 having the new uplink transmission timing. The terminal 601 which has received the message of operation 621 stores/configures the configuration information on the SCell#1 615 and SCell#2 617 having the new uplink transmission timing at operation 625.

If eNB 611 has determined to activate the SCell#1 615 configured for the UE 601, the UE 601 activates the SCell#1 615 by transmitting a MAC layer message at operation 631. The MAC layer message may be Activation MAC Control Element (CE) message defined in the 3GPP TS36.321 MAC. The Activation MAC CE include an indicator indicating activation of SCell#1 615.

Upon receipt of the message of operation 631, the UE activates the SCell#1 615, transmits SRS using the timing resource allocated with the SRS channel configuration information received at operation 621, and performs, if the scheduling information on uplink transmission for the SCell#1 615 is received, uplink transmission using the timing and resource allocated based on the scheduling information at operation 633.

The terminal 601 transmits SRS through SCell#1 615 at operation 635. The UE 601 receives the scheduling information for uplink transmission in SCell#1 615 through Physical Downlink Control Channel (PDCCH) at operation 637. The UE 601 performs uplink transmission in the SCell#1 615 based on the scheduling information of the operation 637 at operation 639. If the eNB 611 determines to activate the SCell#2 617 configured for the UE 601, it transmits a MAC layer message to activate the SCell#2 617 at operation 641. The MAC layer message may be Activation MAC Control Element (CE) message defined in the 3GPP TS 36.321 MAC. The Activation MAC CE includes an indicator for activating the SCell#2 617.

The UE 601 received the message of operation 641 activates the SCell#2 617 or suspends SRS transmission indicated in the SRS channel configuration information received at operation 621 and ignores, if the scheduling information for uplink transmission in the SCell#2 617, the scheduling information at operation 643. The SRS transmission in the SCell#2 617 is suspended at operation 645. That is, the UE does not transmit SRS in the SCell#2 617. The UE 601 receives the uplink transmission scheduling information for the SCell#2 through PDCCH at operation 647.

If the uplink transmission scheduling information for the SCell#2 617 is received, the UE 601 ignores the scheduling information at operation 649. That is, in the state that the SCell#2 617 is activated, it is possible to receive downlink channel but not to transmit uplink channel. However, if a random access initiation command is received, it is possible to transmit a Random Access Preamble in uplink.

The eNB 611 which has determined to synchronize the uplink transmission timings of the UE 601 in the SCell#2 through random access procedure commands the UE 601 to perform random access in the SCell#2 617 at operation 651. The random access command message may be a physical control message called PDCCH order defined in the 3GPP TS36.212 E-UTRA multiplexing and channel coding. If it is commanded to perform random access in the SCell#2 617, the UE 601 transmits a Random Access Preamble in the SCell#2 617 at operation 653.

If a response message is received in response to the Random Access Preamble at operation 655, the UE 601 synchronizes the uplink transmission timing in the SCell#2 617 using the uplink timing information (Timing Advance, TA) included in the Random Access Response message. By matching the reception timing of the message of operation 655 to the uplink transmission timing to the SCell#2, it the actual uplink transmission timing may mismatch but the uplink transmission may be possible after a predetermined time since the receipt of the message of 655.

If the uplink transmission synchronization is acquired in the SCell#2 617, the SRS transmission based on the SRS channel configuration information 621 starts and, if the scheduling information for uplink transmission in the SCell#2 is received, the UE 601 performs uplink transmission at the timing on the resource indicated in the scheduling information at operation 661. The UE 601 transmits SRS in the SCell#2 617 at operation 663. The UE 601 receives the scheduling information for uplink transmission in the SCell#2 617 through PDCCH at operation 665. The UE 601 performs uplink transmission in the SCell#2 based on the scheduling information of operation 665.

That is, if a message for activating the SCell configured for carrier aggregation is received, the UE 601 and if the UE 601 maintains (valid) uplink transmission timing for the activated (if the uplink transmission timing for the SCell is maintained or the uplink transmission timing for another cell using the same uplink timing as the SCell is maintained), the UE 601 starts SRS transmission using the timing and resource allocated based on the SRS channel configuration information after activation of the SCell and, if the scheduling information for uplink transmission in the SCell is received, performs uplink scheduling according to the received scheduling information. If the UE receives the message for activating the SCell configured for carrier aggregation and if the (valid) uplink transmission timing for the activated SCell is maintained, the UE 601 suspends the SRS transmission based on the SRS channel configuration information and ignores the scheduling information received for uplink transmission in the SCell. The SCell has been activated by the activation message but no uplink transmission occurs. That is, in the case that the UE commands to perform random access, the UE may transmit a Random Access Preamble, the suspension of the SRS transmission and the ignorance of scheduling information for uplink transmission are released when the UE performs random access procedure in the corresponding cell to receive the uplink timing information through the Random Access Response message and synchronize the uplink transmission timing and, since then, the SRS transmission starts based on the SRS channel configuration information and the uplink and uplink transmission is performed based on the uplink scheduling information.

Figure 7:
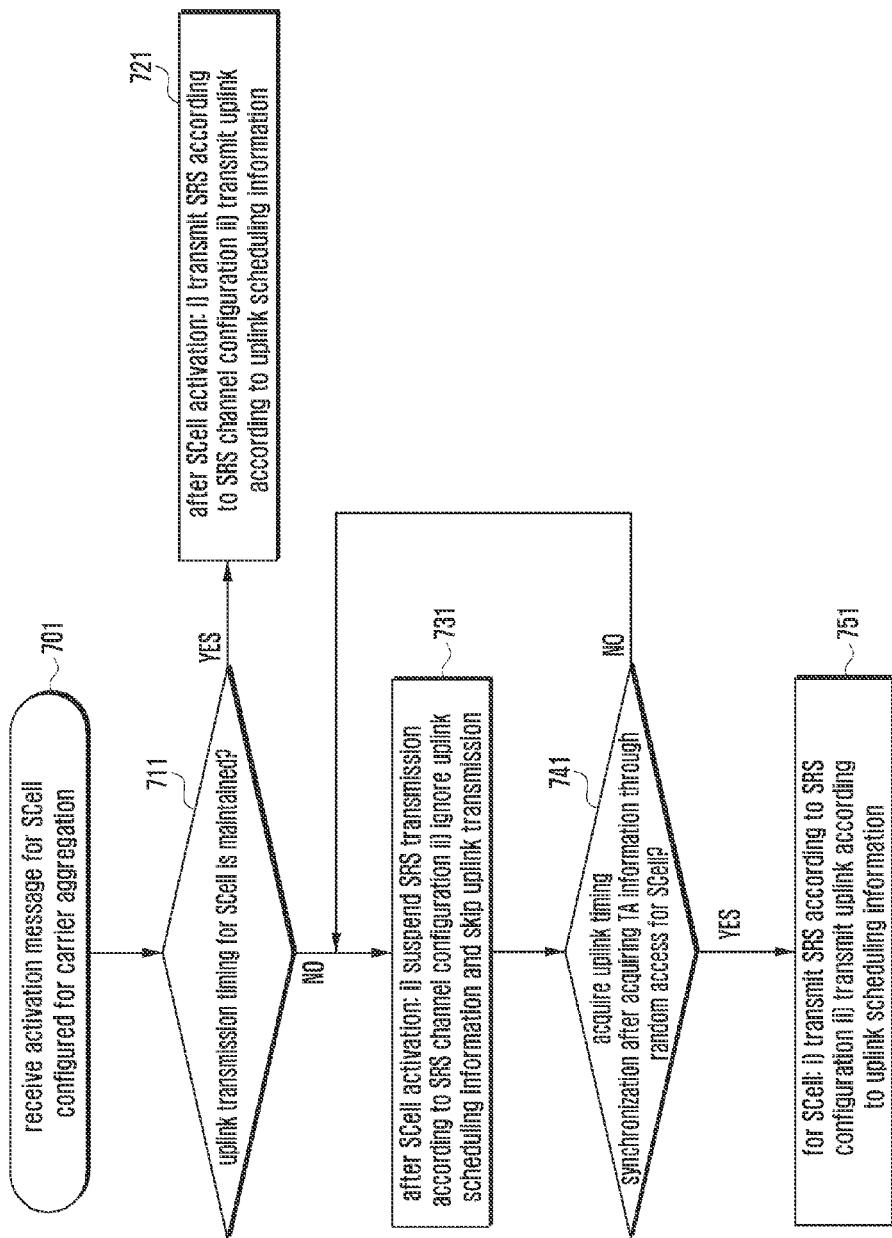
FIG. 7 is a flowchart illustrating a cell activation procedure of the UE 601 according to an embodiment of FIG. 6.

FIG. 7 is a flowchart illustrating a cell activation procedure of the UE 601 according to an embodiment of FIG. 6. If an activation request message for the SCell configured for carrier aggregation is received at operation 701, the UE determines whether the uplink transmission timing is maintained at operation 711. If the uplink transmission timing in the SCell or in another serving cell using the same uplink transmission timing as the SCell is maintained, the UE activates the SCell, starts transmitting SRS according to the SRS channel configuration, and performs uplink transmission in the SCell according to the uplink scheduling information at operation 721. If no uplink transmission timing for the SCell or the serving cell using the same uplink transmission timing as the SCell is acquired (synchronized), the UE activates the SCell, suspends SRS transmission according to the SRS channel configuration, and ignores the uplink scheduling information on the SCell, resulting in not uplink transmission, at operation 731. However, if the eNB 611 commands the UE 601 to perform in the SCell, the UE 601 may transmit the Random Access Preamble in the SCell. If the Timing Advance (TA) information on the SCell is acquired through the random access procedure in the SCell and the uplink transmission timing is acquired at operation 741, the UE starts transmitting SRS suspended in the SCell and performs uplink transmission according to the uplink scheduling information on the SCell at operation 751.

Figure 8:
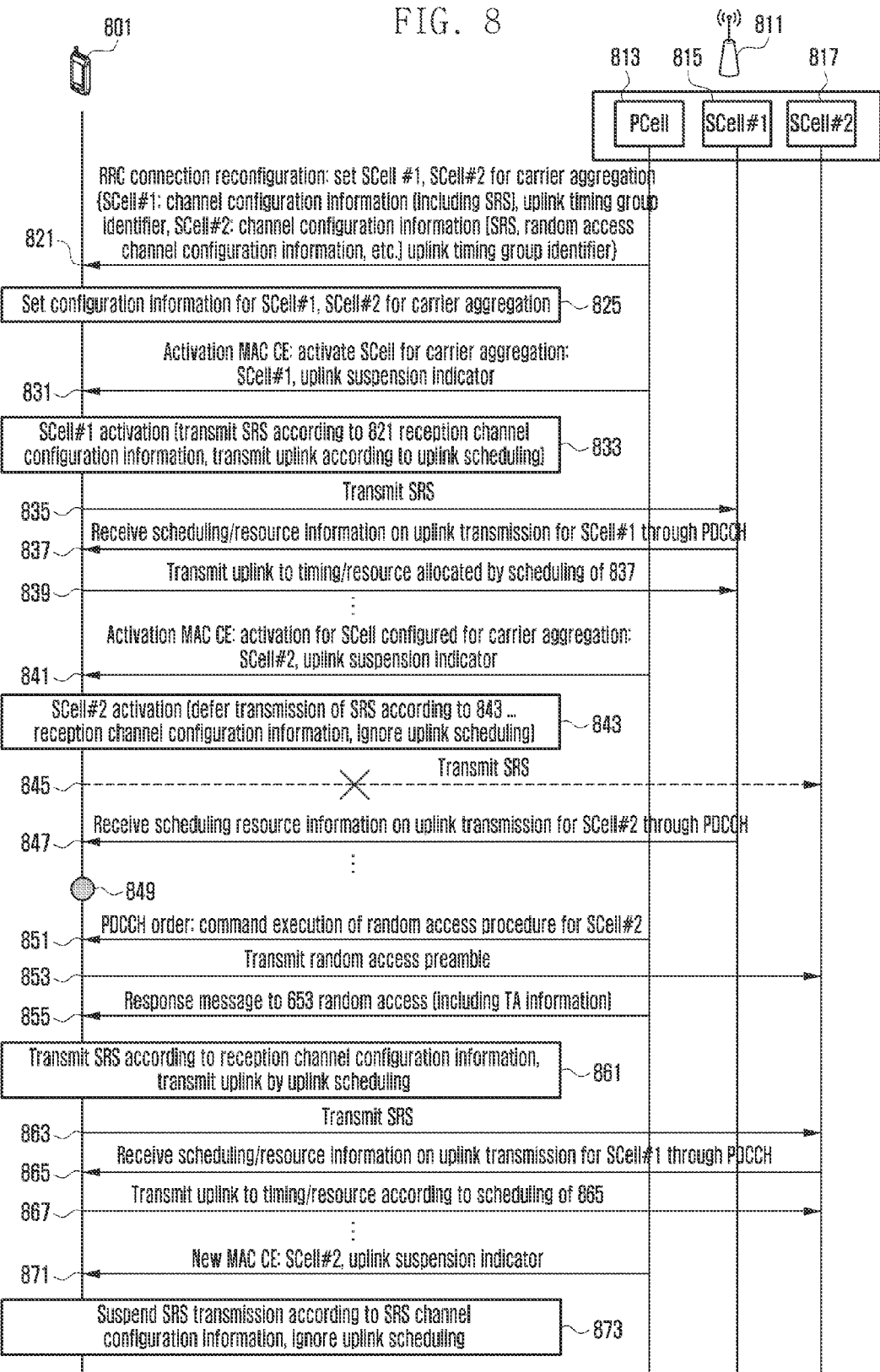
FIG. 8 is a signaling diagram illustrating a cell activation procedure according to another embodiment of the present disclosure.

FIG. 8 is a signaling diagram illustrating a cell activation procedure according to another embodiment of the present disclosure. The eNB 811 determines to configure the serving cells (SCell#1 815 and SCell#2 817) operating on the secondary carriers to be aggregated for the UE 801 capable of carrier aggregation in the serving cell (PCell) 813 operating on the primary carrier and transmits the configuration information on the SCell#1 815 and SCell#2 817 through an RRC layer message to configure the SCell#1 815 and SCell#2 817 as the carrier aggregation-configured cells of the UE 801 at operation 821. The RRC layer message may be the RRCConnectionReconfiguration message defined in the 3GPP TS36 Radio Resource Control (RRC). The configuration information on the SCell#1 815 and SCell#2 817 may include the channel configuration information and the Timing Advance Group (TAG) identifier of the serving cells 815 and 817. The channel configuration information of the serving cell may include Sounding Reference Symbol (SRS) channel configuration information and random access channel configuration information. The SRS channel is the physical (PHY) channel carrying the signal for used in uplink channel estimation of the eNB.

In the embodiment of FIG. 8, it is assumed that the TAG identifier of the SCell#1 815 is identical with the TAG identifier of the PCell 815 on the current primary carrier and the TAG identifier of the SCell#2 817 is different from the TAG identifier of the PCell 813 and SCell#1 815. That is, the uplink transmission timings of the PCell 813 and the SCell#2 817 are identical with each other, and the uplink transmission timing of the SCell#2 817 and the uplink transmission timings of the PCell 813 and the SCell#1 815 are different from each other. The random access channel configuration information may include the information on both the SCell#1 815 and SCell#1 817 or only the SCell#2 817 having the new uplink transmission timing. In the embodiment of FIG. 8, it is assumed that the information on the SCell#2 817 having the new uplink transmission timing is included. Upon receipt of the message of operation 821, the UE 801 stores/configures the configuration information on the SCell#1 815 and SCell#2 817 for carrier aggregation at operation 825.

If it is determined to activate the SCell#1 815 configured to the UE, the eNB 811 transmits a MAC layer message to activate the SCell#1 815 at operation 831. The MAC layer message may be the Activation MAC CE message defined in the 3GPP TS36.321 MAC. The Activation MAC CE includes the indicator for activating the SCell#1 815 and the uplink suspension indicator information. It is assumed that the signaling of operation 831 has the uplink suspension indicator information is set to FALSE. If the uplink suspension indicator information is set to FALSE, this allows the UE 801 to perform uplink transmission in the SCell after its activation.

If the message of operation 831 is received, the UE 801 activates the SCell#1 815, transmits SRS using the resource of the timing allocated with the SRS channel configuration information received at operation 821 and, if the scheduling information on the uplink transmission for the SCell#1 815, performs uplink transmission using the timing and resource allocated with the scheduling information at operation 833. The UE 801 performs SRS transmission in the SCell#1 815 at operation 835. The UE 801 receives the scheduling information for uplink transmission in the SCell#1 815 through the Physical Downlink Control Channel (PDCCH) at operation 837. The UE 801 performs uplink transmission in the SCell#1 815 based on the scheduling information of operation 837 at operation 839.

If it is determined to activate the SCell#2 817 configured to the UE 801, the eNB 811 transmits a MAC layer message to activate the SCell#2 817 at operation 841. The MAC layer message may be the Activation MAC Control Element (CE) message defined in the 3GPP TS36.321. The Activation MAC CE includes the indicator for activating the SCell#2 and uplink suspension indicator information. It is assumed that the signal of operation 841 includes the uplink suspension indicator information set to TRUE. If the uplink suspension indicator information is set to TRUE, this indicates that the UE 801 suspends uplink transmission in the SCell until the uplink transmission timing is synchronized with the acquisition of uplink timing information (TA) on the SCell through random access procedure. For example, the configured SRS channel transmission is suspended and, if the scheduling information on the uplink transmission in the SCell is received through PDCCH, ignores the scheduling information on the uplink transmission, resulting in no uplink transmission. In the eNB commands to perform the random access in the SCell, however, it is possible to transmit the Random Access Preamble in uplink. If the uplink suspension indicator information is set to TRUE, the UE 801 has to perform the operation associated to the TRUE information value regardless of whether the uplink transmission timing on the cell is maintained or not.

If the message of operation 841 is received, the UE 801 activates the SCell#2 or suspends the SRS transmission based on the SRS channel configuration information received at operation 821 and ignores, if any scheduling information on uplink transmission in the SCell#2 817, the scheduling information at operation 843. The UE 801 suspends the SRS transmission in the SCell#2 817 at operation 845. That is, the UE 801 does not transmit SRS in the SCell#2 817. The UE 801 receives the scheduling information for uplink transmission in the SCell#2 817 through PDCCH. If the scheduling information for uplink transmission in the SCell#2 817 is received, the UE 801 ignores the scheduling information at operation 849. That is, although the SCell#2 817 is activated, the uplink transmission is suspended but the downlink channel reception is permitted (i.e. the uplink transmission is impossible in the SCell#2 817). In the case that there is random access command of the eNB 811, however, the UE 801 is capable of transmitting the Random Access Preamble in uplink.

If it is determined to synchronize the uplink transmission timing of the UE 801 through random access procedure in the SCell#2, the eNB 811 command the UE 801 to perform the random access in the SCell#2 at operation 851. The random access command message may be a physical control message called PDCCH order defined in the 3GPP TS36.212 E-UTRA Multiplexing and channel coding. If the random access execution command in SCell#2 817 is received, the terminal 801 transmits a Random Access Preamble through the SCell#2 817 at operation 853. If a Random Access Response message is received at operation 855, the UE 801 synchronizes the uplink transmission timing of the SCell#2 817 using the SCell#2 uplink timing information (TA) included in the Random Access Response message. The timing of receiving the message of operation 855 and the timing capable of actual uplink transmission in match with the uplink transmission timing in the SCell#2 817 may mismatch each other. The UE may perform uplink transmission in a certain time after the receipt of the message of operation 855.

If the uplink transmission timing in the SCell#2 817 is synchronized, the UE starts SRS transmission based on the SRS channel configuration information received at operation 821 and, if the scheduling information for uplink transmission in the SCell#2 817 is received, the UE 801 performs uplink transmission using the timing and resource allocated with the scheduling information at operation 861. The UE 801 performs SRS transmission in the SCell#2 817 at operation 863. The UE 801 receives the scheduling information for uplink transmission in the SCell#2 817 through PDCCH at operation 865. The UE 801 performs uplink transmission in the SCell#2 817 based on the scheduling information of operation 865.

The uplink suspension indicator is transmitted in the SCell activation message in the above embodiments. However, the uplink suspension indicator may be transmitted using a separate message for the SCell that has been already activated at operation 871. The message includes the identifier information on the corresponding SCell and uplink suspension indicator information. if the SCell identifier information indicates the SCell#2 817 and the uplink suspension indicator is set to TRUE, the UE suspends the uplink transmission in the SCell#2 817 until the uplink transmission timing is synchronized with acquisition of the uplink timing information for the SCell#2 817 through random access procedure regardless of the uplink transmission timing in the SCell#2 817. For example, the configured SRS channel transmission is suspended, and, if the scheduling information for uplink transmission in the SCell through PDCCH, the UE 801 ignores the scheduling information on uplink transmission, resulting in not uplink transmission, at operation 873. If the eNB commands to perform the random access in the SCell, however, it is possible to transmit a Random Access Preamble in uplink.

That is, the UE 801 performs the SRS transmission configured for the SCell and scheduled uplink transmission or suspends the uplink transmission with the exception of the Random Access Preamble transmission (if eNB commands Random Access Preamble transmission) until the uplink transmission timing is (re)synchronized with the acquisition of the uplink timing information (TA) for the SCell through the next random access procedure, according to the uplink suspension indicator value received from the eNB 811. For example, the configured SRS channel transmission is suspended and, if the scheduling information for uplink transmission in the SCell through PDCCH is received, the UE 801 ignores the scheduling information for uplink transmission and skips corresponding uplink transmission.

Figure 9:
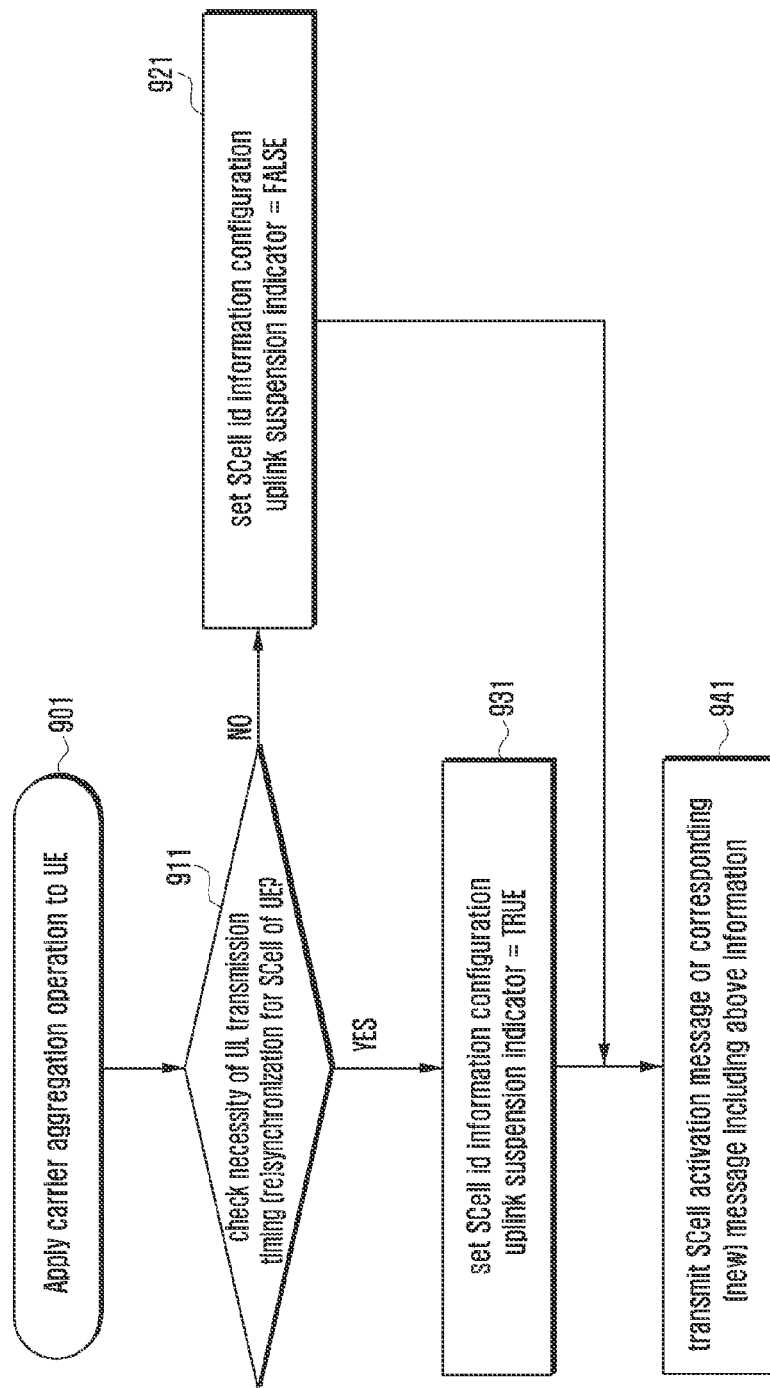
FIG. 9 is a flowchart illustrating the cell activation procedure of the eNB 811 according to the embodiment of FIG. 8.

FIG. 9 is a flowchart illustrating the cell activation procedure of the eNB 811 according to the embodiment of FIG. 8. The present disclosure is applied when the eNB 811 communicates with the UE 801 capable of carrier aggregation at operation 901. The eNB 811 checks whether the uplink transmission timing (re)synchronization is required in the SCell for the UE 801 at operation 911. For example, if it is necessary to activate the SCell requiring uplink transmission timing different from those of other serving cells activated for the UE 801 or if the SCell has been activated already but has a problem in uplink transmission, the eNB 811 may determine that there is a need of re(synchronizing) the uplink transmission timing for the SCell. If it is determined that there is no need of (re)synchronizing the uplink transmission timing in the SCell for the UE at operation 911, the eNB 811 configures the corresponding SCell identifier information and sets the uplink suspension indicator information to FALSE at operation 921. Otherwise if it is determined that there is a need of (re)synchronizing the uplink transmission timing in the SCell for the UE, the eNB 811 configures the SCell identifier information and set the uplink suspension indicator information to TRUE at operation 931. The eNB transmits the SCell identifier information and uplink suspension indicator information in the SCell activation message (e.g. Activation MAC CE) or a new or another legacy message at operation 941.

Figure 10:
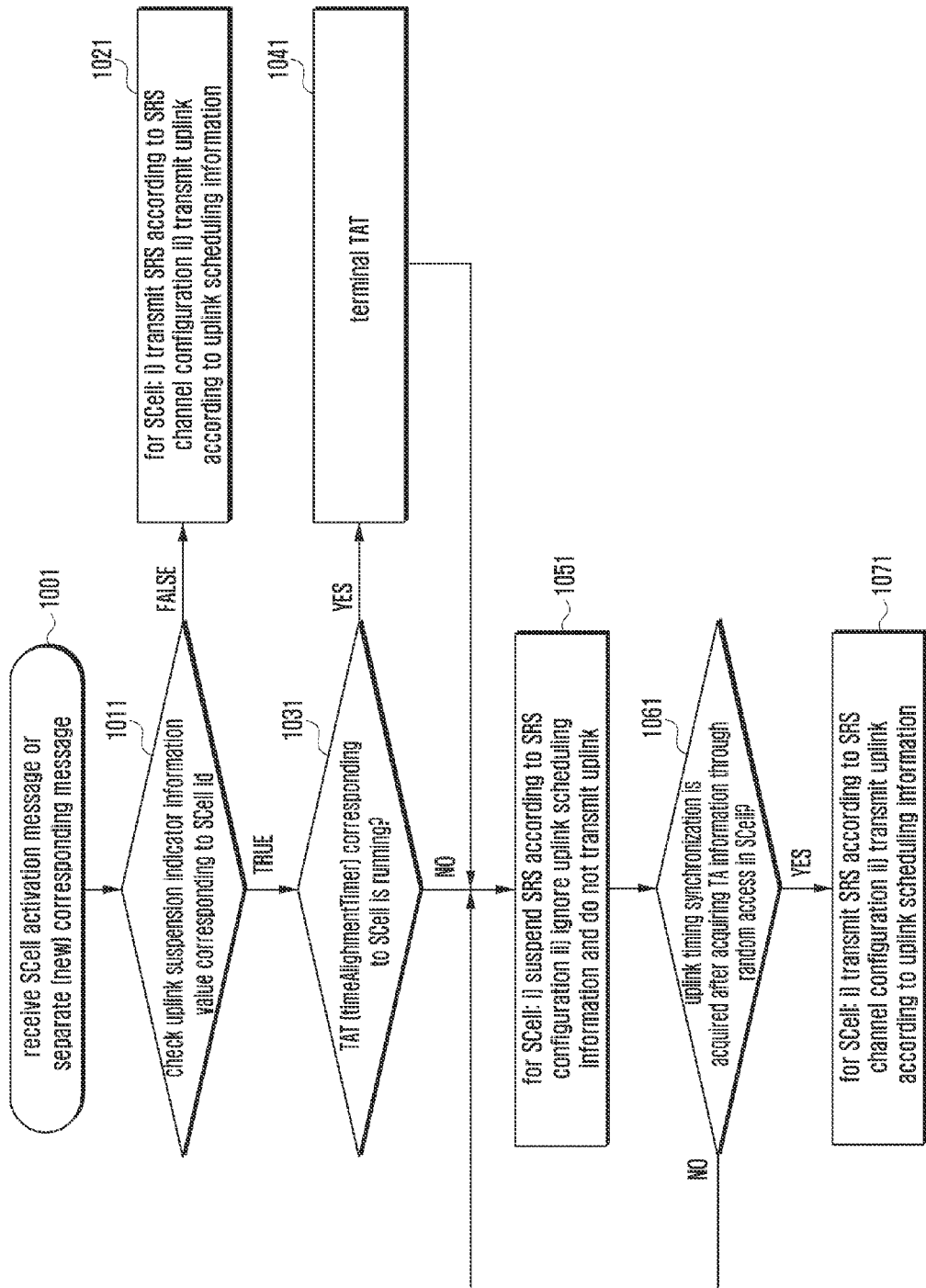
FIG. 10 is a flowchart illustrating the cell activation procedure of the UE 801 according to the embodiment of FIG. 8.

FIG. 10 is a flowchart illustrating the cell activation procedure of the UE 801 according to the embodiment of FIG. 8.

The UE 801 receives an activation message for the SCell configured for carrier aggregation or a separate message for the SCell which has been already activated at operation 1001. The message may be replaced by another MAC layer or RRC layer message or a new MAC layer or RRC layer message defined for uplink suspension indicator information. The UE 801 checks the uplink suspension indication information value corresponding to the SCell identifier included in the message at operation 1011. If the uplink suspension indicator information value is set to FALSE, the UE 801 starts SRS transmission according to the SRS channel configuration for the SCell and performs uplink transmission in the SCell according to the received uplink scheduling information at operation 1021. Otherwise if the uplink suspension indicator information value is set to TRUE, the UE 801 checks whether the TAT (timeAlignmentTimer) corresponding to the SCell is running currently at operation 1031. The TAT is the timer for verifying the validity of the uplink transmission timing information (TA) received from the eNB, the timer (re)starting upon receipt of the TA information from the eNB and, if it expires, the uplink transmission timing being not valid any longer. If the TAT for the SCell is running, the UE 801 stops the timer at operation 1041, suspends the SRS transmission according to the SRS channel configuration, and does not perform corresponding uplink transmission at operation 1051. However, if the eNB commands to perform random access in the SCell, the Random Access Preamble may be transmitted in the SCell. if the random access is performed in the SCell so are to acquire TA information for the SCell and (re)synchronize the uplink transmission timing at operation 1061, the UE 801 starts the SRS transmission in the SCell and performs uplink transmission according to the uplink scheduling information at operation 1071.

Figure 11:
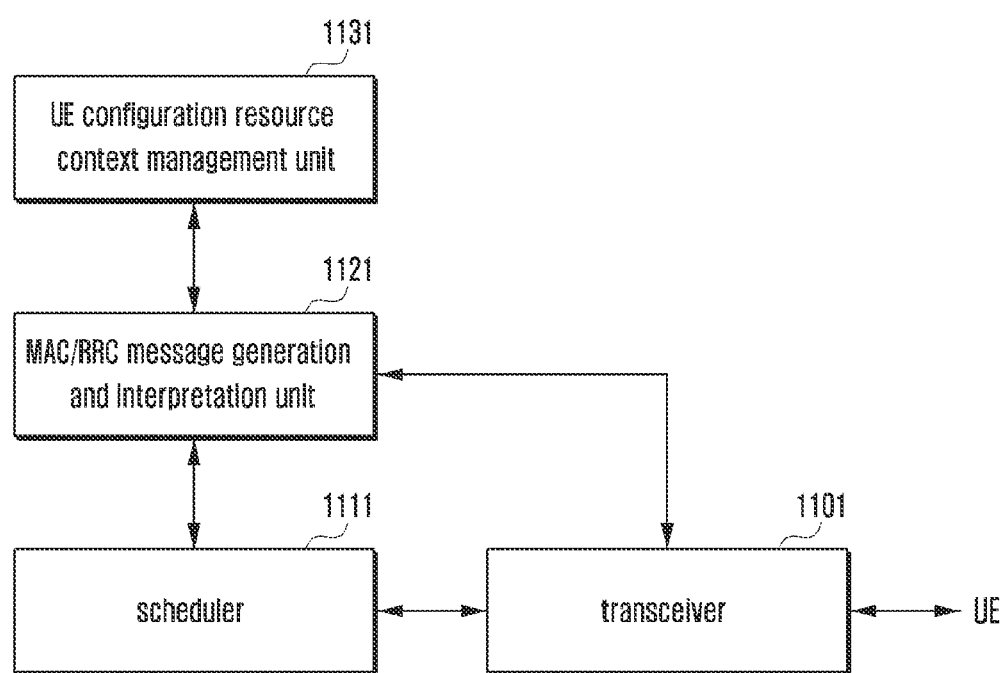
FIG. 11 is a block diagram illustrating the eNB according to an embodiment of the present disclosure.

FIG. 11 is a block diagram illustrating the eNB according to an embodiment of the present disclosure. The physical transceiver 1101 is responsible for communication with a UE. The scheduler 1111 is responsible for scheduling downlink and uplink transmissions for UEs and cells (PCell and SCell). The message generation and interpretation unit 1121 transmits the control information to the UE and interprets the information carried in the received message. The message generation and interpretation unit 1121 may be a MAC layer or RRC layer entity. The context management unit 1131 manages the context of the UE, the cells configured for the UE, and channel configuration resource. If it is detected, by means of the transceiver 1101, that there is any problem in receiving signals through the SCell or if the SCell requiring new uplink transmission timing is activated by means of the context management unit for the UE and the configuration resource, the MAC/RRC message generation and interpretation unit 1121 configures the SCell identifier and uplink suspension indicator information and transmits the corresponding message by means of the transceiver 1101.

Figure 12:
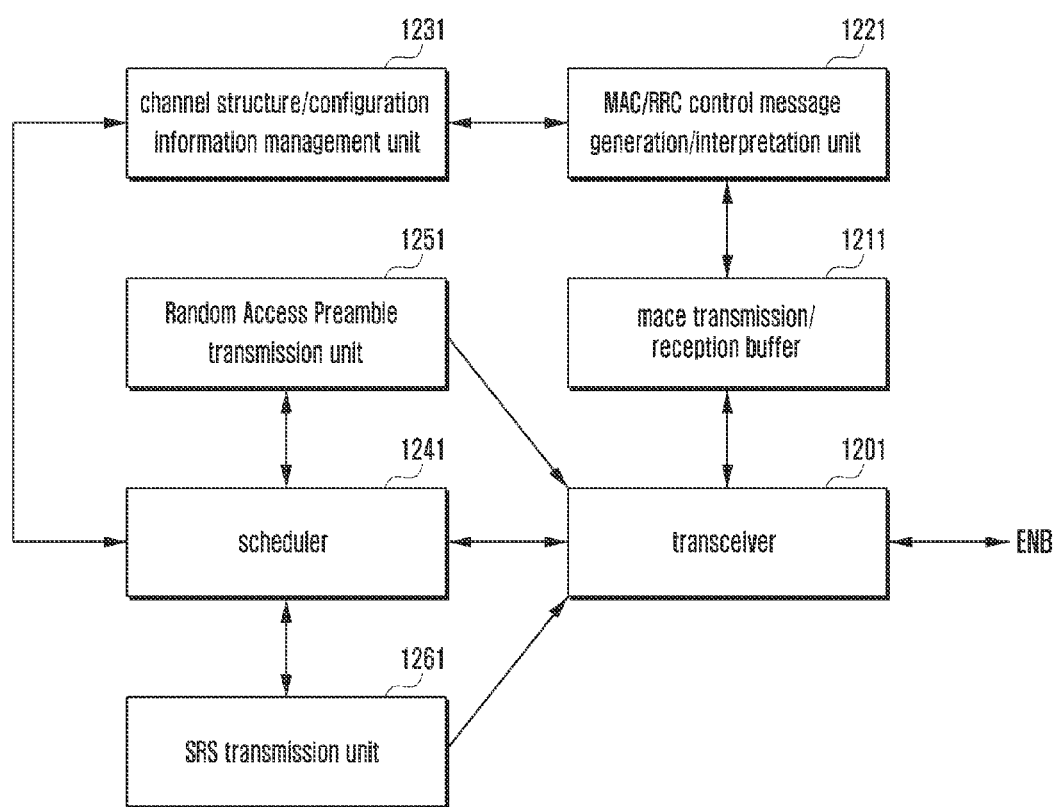
FIG. 12 is a block diagram illustrating the UE according to an embodiment of the present disclosure.

FIG. 12 is a block diagram illustrating the UE according to an embodiment of the present disclosure. If the SCell activation message or a separate message is received form the eNB through a physical transceiver 1201 responsible for communication with the eNB, the MAC/RRC layer control message generation/interpretation unit 1221 interprets the control information included in the message. The UE may turns on/off the transmission of the control information/data buffered in the SRS transmission unit 1261 for the SCell and the MAC transmission buffer 1211 using the scheduler 1241 by referencing the information included in the SCell activation message and the separated message or the context information of the corresponding SCell of the channel structure/configuration information management unit 1231. Although the SRS and control information/data transmission for the S Cell is off, if the eNB commands to perform the random access, the Random Access Preamble transmission unit 1251 may transmits the Random Access Preamble under the control of the scheduler 1241.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to the embodiments of the invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

The invention claimed is:

1. A method for establishing time alignment by a terminal in a wireless communication system supporting carrier aggregation, the method comprising:
receiving, from a base station, medium access control (MAC) control information for activating a secondary cell (SCell);
activating the SCell based on the MAC control information;
determining whether a timer associated with a timing advance group to which the SCell belongs is running, the timer being used to control the timing advance group to be uplink time aligned;
transmitting a random access preamble on the SCell if the timer is not running; and
receiving a random access response message including timing advance information.

2. The method of claim 1, further comprising:
if the timer is running, performing the uplink transmission on the SCell based on the timer.

3. The method of claim 1, further comprising: establishing time alignment based on the timing advance information.

4. The method of claim 2, wherein performing uplink transmission comprises transmitting sounding reference signal (SRS) on the SCell.

5. The method of claim 2, wherein performing uplink transmission comprises receiving scheduling information for the uplink transmission through physical downlink control channel (PDCCH) and performing the uplink transmission on the SCell based on the scheduling information.

6. A terminal in a wireless communication system supporting carrier aggregation, the terminal comprising:
a transceiver configured to receive and transmit a signal; and
a controller coupled with the transceiver and configured to:
receive, from a base station, medium access control (MAC) control information for activating a secondary cell (SCell),
activate the SCell based on the MAC control information,
determine whether a timer associated with a timing advance group to which the SCell belongs is running, the timer being used to control the timing advance group to be uplink time aligned,
transmit a random access preamble on the SCell if the timer is not running, and
receive a random access response message including timing advance information.

7. The terminal of claim 6, wherein the controller is further configured to perform the uplink transmission on the SCell based on the timer, if the timer is not running.

8. The terminal of claim 6, wherein the controller is further configured to:
establish time alignment based on the timing advance information.

9. The terminal of claim 7, wherein the controller is further configured to perform uplink transmission comprises transmitting sounding reference signal (SRS) on the SCell.

10. The terminal of claim 7, wherein the controller is further configured to:
receive scheduling information for the uplink transmission through physical downlink control channel (PDCCH), and
perform the uplink transmission on the SCell based on the scheduling information.

11. A method for establishing time alignment by a base station in a wireless communication system supporting carrier aggregation, the method comprising:
transmitting, to a terminal, medium access control (MAC) control information for activating a secondary cell (SCell);
determining whether to receive, from the terminal, a random access preamble on the SCell according to an operation of a timer associated with a timing advance group to which the SCell belongs, the timer being used to control the timing advance group to be uplink time aligned;
receiving the random access preamble on the SCell if the timer is not running; and
transmitting a random access response message including timing advance information.

12. The method of claim 11, further comprising:
if the timer is running, receive the uplink transmission on the SCell from the terminal.

13. A base station in a wireless communication system supporting carrier aggregation, the base station comprising:
a transceiver configured to transmit and receive a signal; and
a controller coupled with the transceiver and configured to:
transmit, to a terminal, medium access control (MAC) control information for activating a secondary cell (SCell),
determine whether to receive, from the terminal, a random access preamble on the SCell according to an operation of a timer associated with a timing advance group to which the SCell belongs, the timer being used to control the timing advance group to be uplink time aligned,
receive the random access preamble on the SCell if the timer is not running, and
transmit a random access response message including timing advance information.

14. The base station of claim 13, wherein the controller is further configured to receive the uplink transmission on the SCell from the terminal if the timer is running.

* * * * *